United States Patent [19]

Kinneberg

[11] Patent Number: 5,239,819

[45] Date of Patent: Aug. 31, 1993

[54] STEROL ICE NUCLEATION CATALYSTS

[76] Inventor: Bruce I. Kinneberg, 625 Marina Vista, Martinez, Calif. 94553

[21] Appl. No.: 846,353

[22] Filed: Mar. 6, 1992

[51] Int. Cl.$^5$ .......................... F25D 3/00; F25C 1/00; C09K 3/18

[52] U.S. Cl. .......................................... 62/59; 62/66; 252/70

[58] Field of Search ....................... 62/59, 66; 252/70; 23/300; 165/10

[56] References Cited

U.S. PATENT DOCUMENTS

| | | | |
|---|---|---|---|
| 3,852,155 | 12/1974 | Moore | 62/66 |
| 3,858,805 | 1/1975 | Shen et al. | |
| 4,154,292 | 5/1979 | Herrick | 62/59 X |
| 4,331,556 | 5/1982 | Arrhenius | 23/300 X |
| 4,447,347 | 5/1984 | Goldfarb et al. | 252/70 |
| 4,518,514 | 5/1985 | Kamohara et al. | 252/70 |
| 4,561,493 | 12/1985 | Yanadori et al. | 252/70 X |
| 4,690,769 | 9/1987 | Lane et al. | 252/70 |
| 4,821,794 | 4/1989 | Tsai et al. | 62/59 X |
| 4,827,735 | 5/1989 | Foley | 62/59 X |
| 4,856,296 | 8/1989 | Shu | 62/59 X |
| 4,928,493 | 5/1990 | Gilbertson et al. | |
| 5,082,582 | 1/1992 | Ames et al. | 23/300 X |

FOREIGN PATENT DOCUMENTS

| | | | |
|---|---|---|---|
| 0246824 | 11/1987 | European Pat. Off. | |
| 3209125 | 11/1982 | Fed. Rep. of Germany | 252/70 |
| 0097872 | 4/1990 | Japan | 62/66 |
| 3045686 | 2/1991 | Japan | 252/70 |
| 8702691 | 5/1987 | World Int. Prop. O. | 252/70 |

OTHER PUBLICATIONS

Rabel, Gabriele, "Water at −72°", Science, May 28, 1948, vol. 107.

Williams, John L., "Account of the Method of Making Ice at Benares", Phil. Trans. of the Royal Society of London, 1973 pt. I p. 56.

Head, R. B., "Steroids as Ice Nucleators," Nature 191:1058–1059 (1961).

Head, R. B., "Ice Nucleation by Some Cyclic Compounds," J. Phys. Chem. Solids 23:1371–1378 (1962).

Fukuta, N. and Mason, B. J., "Epitaxial Growth of Ice on Organic Crystals," J. Phys. Chem. Solids 24:715–718 (1963).

Bernal, J. D., et al., "X-Ray Crystallography and the Chemistry of the Steroids, Part I," Phil. Trans. R. Acad. Soc. London, Ser. A 239A:135–182 (1940).

Duax, W. L., et al., "Conformational Analysis of Sterols: Comparison of X-Ray Crystallographic Observations with Data from Other Sources," Lipids 15:783–792 (1980).

Loomis, C. R., "The phase behavior of hydrated cholesterol," J. Lipid Res. 20:525–535 (1979).

Byers, H. R., "Nucleation in the atmosphere," Indus. Eng. Chem. 57:32–40 (1965).

Fukuta, N., "Experimental Studies of Organic Ice Nuclei," J. Atmos. Sci. 23:191–196 (1966).

Montefinale, A. C., et al., "Recent Advances in the Chemistry and Properties of Atmospheric Nucleants: a Review," Pure Appl. Geophys. 91:171–210 (1971).

Primary Examiner—Henry A. Bennet
Assistant Examiner—Christopher B. Kilner
Attorney, Agent, or Firm—McCubbrey, Bartels, Meyer & Ward

[57] ABSTRACT

This invention provides for improved sterol nucleators of ice crystals. The improvement is the use of water stable crystalline forms of the sterols. These forms advantageously provide predictable nucleation temperatures which are stable for long periods of time, especially where the water is repeatedly frozen and thawed. In commercial ice making systems, the selection of stable forms of sterols having high nucleation temperatures provide great savings in construction and energy costs.

24 Claims, No Drawings

STEROL ICE NUCLEATION CATALYSTS

BACKGROUND OF THE INVENTION

1. Field of the Invention

This invention provides for improved sterol nucleators of ice crystals. The improvement is the use of water-stable crystalline forms of the sterols. These forms advantageously provide predictable nucleation temperatures which are stable for long periods of time, especially where the water is repeatedly frozen and thawed. In commercial ice making systems, the selection of stable forms of sterols having high nucleation temperatures provide great savings in energy and construction costs.

By way of background, pure water will supercool before forming ice. Depending upon the purity, water may be cooled to $-10°$ to as low as $-40°$ C. before crystallizing into ice. Under optimum conditions, the transition to ice can be quite rapid with the heat of crystallization raising the temperature of the water from its supercooled state to the $0°$ C. typical of ice. This crystallization temperature can be raised by the addition of nucleators, such as mineral particles, proteins, terpenes or sterol crystals.

Although sterols are known to be nucleators of ice, their uses have been mostly limited to situations where the water is not repeatedly frozen and thawed. Moreover, the sterols of prior art were mostly dehydrated and gave unreliable nucleation temperatures. Prior art taught that nucleation performance could be improved by procedures known to promote formation of anhydrous crystals such as solidification from the melt or crystallization from a dry, non-polar solvent such as benzene.

My investigations confirm that prior art sterols have significantly reduced nucleation ability after extended water contact. This renders them relatively costly for larger commercial systems where construction and operating costs are important. In contrast and surprisingly, intentionally hydrated sterols have been discovered to be vastly superior as ice nucleators and offer instances of stable ice nucleating performance at above $-2°$ C. where very few nucleators of any type (e.g., metaldehyde, fluorophlogopite mica) have ever been reported. This invention identifies examples of such sterols and discloses a simple means to readily identify other such sterols.

The concept of a "threshold or onset nucleation temperature" as used in prior art is inappropriate for the invention disclosed here. Here it should be appreciated that the probability of a unit freezing in a multi-unit ice making system is statistically distributed around the nucleation temperature. The width of such a distribution with temperature may be unique to each nucleator. For this reason and as further explained below, it is necessary to chill the sterol suspensions a degree or two below the nucleation temperature. This ensures that sufficient units actually crystallize into ice (e.g., 90% crystallize during a chilling cycle). The optimum chilling temperature is readily obtained by routine experimentations and application of basic statistical methods.

Thus, it should be understood that when refrigeration devices lower the ambient temperature of individual units or vessels containing the solutions of this invention to the nucleating temperature, approximately 50% of the units will freeze. For this reason the refrigeration device must chill the vessels at least one degree below the nucleation temperature to be of practical use.

One of the problems this invention solves is that nucleating temperatures of greater than $-3°$ C. permit the adaption of existing air conditioning systems without replacing the existing compressors supplying a building's air conditioning or refrigeration. The existing standards for many air conditioners of commercial buildings do not permit the refrigeration of a brine heat transfer liquid to $-9°$ C. required to freeze the sterol-containing building chilling systems of the prior art.

Moreover, use of such low temperatures requires additional amounts of additives to the heat transfer liquid (more salt or ethylene glycol). This decreases the efficiency of the liquids and increases their cost. It is estimated that running a heat transfer liquid at $-7°$ to $-9°$ C. rather than $2°$ to $-3°$ C. requires 16% more energy and 27% greater cooling capacity for the refrigeration devices (e.g., centrifugal compressors). Thus the prior art disclosing cholesterol with a nucleation temperature of $-7.2°$ C. is not useful without substantial modifications to many existing systems.

2. Information disclosure

Dry cholesterol has been used as nucleators of ice crystals in chilled water systems. U.S. Pat. No. 4,928,493. It was subsequently discovered that in multiple tube quiescent tests, freshly crystallized cholesterol nucleated half the water samples within one hour at $-1.9°$ C. When the cholesterol is terminally hydrated after a few freezing cycles or by standing at ambient temperature, it degrades into a low temperature nucleator, active between about $-6°$ C. and $-8°$ C. More precisely, samples initially showing 50% freezing at $-1.9°$ C. later did not freeze at $3.8°$ C., 17% froze at $-5.8°$ C., and 67% froze at $-7.8°$ C. in successive one hour quiescent tests.

By plotting the 0.17 and 0.78 probabilities of freezing versus tests temperature on probability paper, linear interpolation locates the 0.50 probability at $-7.2°$ C., the nucleation temperature of terminally hydrated cholesterol. When the same line is extrapolated to the 0.95 probability level, the temperature is $-9.5°$ C. It should be appreciated that in an ice making system with thousands of individual freezing vessels, these data indicate that a maximum brine temperature of below $-9.5°$ C. is required for prompt nucleation and utilization of 95% of the freezing vessels. If the brine temperature is higher, there will be an even greater fraction of inactive vessels in each cycle. The number of active vessels must be kept constant to maintain a constant thermal capacity, so a greater number of vessels must be employed. This illustrates why cholesterol nucleator necessitates excessive cooling of the brine, excessive installation size or both. Terminally hydrated cholesterol has utility in providing reproducible, but not efficient operation.

The nucleation of ice from vapor is reviewed in H. R. Byers, Nucleation in the Atmosphere, *Indust. and Eng. Chem.* 57(11), 32–40, 1965 and in A. C. Montefinale et al., Recent Advances in the Chemistry and Properties of Atmospheric Nucleants: a Review, *Pure and Appl. Geophys.* 91(8), 171–210, 1971. Others have reported that dry, non-hydrated sterols can act as nucleators of ice from water vapor. R. B. Head, Steroids as Ice Nucleators, *Nature*, 191, 1058–1059, 1961; R. B. Head, Ice Nucleation by Some Cyclic Compounds, *J. Phys. Chem. Solids*, 23, 1371–1378, 1962. The nucleation temperatures of several sterols were reported by N. Fukuta and B. J. Mason, Epitaxial Growth of Ice on Organic Crystals, *J. Phys. Chem. Solids* 24, 715-718, 1963 and in N. Fukuta, Experimental Studied of Organic Ice Nuclei, *J. Atm. Sci.* 23, 191-196, 1966. However, the nucleation temperatures represent estimates from quick tests using water vapor or soap films. The ability of sterols to nucleate ice crystals repeatedly at a stable temperature from the liquid phase has not been evaluated.

The sterols have been studied as to their crystalline structure. J. D. Bernal, et al., X-Ray Crystallography and the Chemistry of the Steroids. Part I, *Phil. Trans. Roy. Soc. London*, No 802, Vol 239A, 135-182, 1940; and, W. L. Duax, et. al. Conformational Analysis of Sterols: Comparison of X-Ray Crystallographic Observations with Data from Other Sources, *Lipids* 15(9), 783-792, 1980. Different crystalline phases of cholesterol have been reported. C. R. Loomis, et. al. The Phase behavior of hydrated Cholesterol, *J. Lipid Res.* 20, 525-535, 1979.

Very high temperature nucleators are rare. An example can be found in U.S. Pat. No. 3,858,805.

SUMMARY OF THE INVENTION

This invention provides for a method for nucleating the crystallization of a hydrogen-bonding ice crystal from an aqueous solution which comprises: (a) adding terminally hydrated 3-hydroxy sterols to the solution in sufficient amount to raise the nucleating temperature to $-6°$ C. or more; and, (b) lowering the temperature of the solution until ice crystals form. In light of the poor performance of the most active and investigated of the prior art sterol nucleators, cholesterol; it is surprising to discover that many terminally hydrated 3-hydroxy sterols have nucleating temperatures greater than $-6°$ C. This invention further provides such nucleators of greater than $-3°$ C. including those above $-2°$ C. Preferred sterols are selected from the group consisting of stigmasterol, diosgenin and combinations thereof. Ergosterol and tigogenin are also preferred sterols. Co-crystals of sterols are also useful. Preferred co-crystals of 3-hydroxy sterols are generated from solutions containing about 3 parts diosgenin to 1 part stigmasterol.

The nucleators of this invention permit repeated freezing and thawing of the aqueous solution at predictable crystallization temperatures. To further enhance ice formation it is preferred to expose the aqueous solutions to kinetic energy either mechanical (pouring, stirring, vibrational or shaking) or acoustical.

A preferred method involves including the sterol containing aqueous solution as a part of a cooling system for a building. A preferred method involves use of an aqueous solution for such a system includes a suspension of diosgenin and stigmasterol in water wherein the ratio of diosgenin to stigmasterol is 100:0 to 50:50 and the amount of diosgenin and stigmasterol increases the nucleating temperature of the water to greater than $-6°$ C.; and, lowering the temperature of the water until ice forms. Preferred embodiments are as stated above.

This invention also provides for systems containing ice in which the ice is generated from an aqueous solution containing 3-hydroxy sterols as described herein. Such systems include systems for chilling buildings.

This invention further provides for system for chilling a warm surface comprising: a refrigeration device capable of cooling a heat transfer liquid below $-6°$ C.; a heat transfer liquid in fluid contact with the refrigeration device; a sealed vessel in fluid contact with the heat transfer liquid said vessel containing an aqueous solution comprising a terminally hydrated 3-hydroxy sterol in sufficient amount to raise the nucleating temperature to $-6°$ C. or more; and, the warm surface in fluid contact with the heat transfer liquid. The preferred aqueous solutions contain the sterols as described above. For example wherein the sterol is selected from the group comprising stigmasterol, diosgenin and combinations thereof and where the sterol has a nucleating temperature of $-2°$ C. or more.

Finally this invention comprises a co-crystal of terminally hydrated diosgenin and stigmasterol.

DEFINITIONS

The term "aqueous" refers to solutions of water or water with material suspended in it.

The phrase "nucleating ice formation" refers to the process of initiating the transition of supercooled water from the liquid to the solid phase.

The term "co-crystal" refers to a crystal of two or more different sterols. Two types are included: mixed crystals where the crystals give a rather blurred X-ray reflections or thermogravimetric or differential calorimeter scans intermediate between those of the individual components, e.g., $\alpha$-, $\beta$-, and $\gamma$- sitosterols; and definite crystal compounds where the combination forms X-ray reflections or thermogravimetric or differential calorimeter features different in position and intensity from either component, e.g. cholesterol-cholestanol-hydrate.

The phrase "crystallization temperature" refers to the temperature at which ice crystal formation initiates.

The phrase "ice formation" refers to the transition of water from the liquid to the solid phase.

The phrase "high temperature [sterol] nucleator" refers to nucleators with nucleating temperatures above $-6°$ C. within 60 minutes. "Very high temperature nucleators" have nucleating temperatures of $-2°$ C. or above within 60 min. and are preferred.

The term "nucleating" or "nucleation" refers to the process of ice crystal formation catalyzed by the use of a composition other than ice.

The phrase "nucleating temperature" refers to the temperature at which quiescent supercooled water shows a 50% chance of forming visible ice crystals in an allotted time while in contact with the nucleating agent. This temperature is somewhat influenced by experimental conditions and for critical comparisons is herein intended to refer to measurements involving a one hour quiescent temperature exposure with 1 part sterol in 200 parts water (0-I gram nucleating agent test specimens in 20 mls water).

The term "solution" refers to an mixture of water and at least some other composition in which the composition is totally hydrated by the water and cannot be centrifuged out of the solution.

The term "3-hydroxy sterols" refers to large class of organic compounds having the perhydro-1,2-cyclopentenophenanthrene ring system substituted with a hydroxy at position 3.

The phrase "terminally hydrated sterols" refers to sterols which have been crystallized and comprise a stable state of hydration, i.e., that state represented after suspension in water for at least 30 days at temperatures between 10° C. and 30° C. This state may be determined empirically by assessing the ability of the sterol to nucleate ice formation in repeated cycles of freezing and thawing.

The phrase "visible ice crystals" refers to ice crystals which are visible to the naked eye.

DETAILED DESCRIPTION

This invention provides for a stable sterol nucleator of ice crystals. It has been discovered that anhydrous and other unstable forms of sterol crystals provide high and very high temperature nucleation of water (e.g., above $-3°$ C.). However with time or repeated cycles of freeze/thaw, the nucleation temperature of the non-terminally hydrated sterol crystals will degrade.

While not wishing to be limited by theory, degradation of nucleation temperature is thought to be due to stress relief and transformation to the terminally hydrated state which is considered to be the most stable state of the sterol crystals.

Non-terminally hydrated sterols are not in thermodynamic equilibrium with pure water. If sterols are not initially prepared for use in the terminally hydrated state, when immersed in water they have been found to behave in complex and generally unfavorable ways. With cholesterol the non-hydrated crystals remain intact, but high temperature nucleator activity permanently fades in all cases. With diosgenin, dry crystals suspended directly in water peptize and high temperature nucleator activity is quickly lost. Quite surprisingly, when terminally hydrated diosgenin crystals prepared from wet alcohol as herein disclosed are used, they remain intact and retain consistent high temperature nucleator activity for at least 235 days. Commercial stigmasterol crystals also rapidly lose much activity in water, but not when first prepared hydrated as herein disclosed.

The use of a stable high temperature nucleator is critical in situations where predictable and long term stability is required for ice nucleators. Nucleators having a very high nucleation temperature are preferred because of energy and construction savings. The sterols of this invention provide such stable very high temperature nucleators.

The preferred uses for nucleating ice with sterols is in large commercial ice making systems where considerations of toxicity, stability, and economic savings are paramount. It has been determined that exceptional energy savings can be achieved by using nucleators able to crystallize water at $-2°$ C. or higher and that commercially acceptable utility is present at temperatures of $-6°$ C. Cholesterol has a stable nucleating temperature of $-7.2°$ C. This relatively low nucleating temperature renders it too expensive to operate on a routine basis. Deionized water nucleates erratically and frequently at temperatures of less than $-10°$ C.

Sterols are a common organic compound having a four ringed structure called a perhydro-1,2-cyclopenteneophenanthrene. The sterols of this invention have a hydroxy substituted at position 3 (most often in the $\beta$ orientation) and are commonly substituted with simple alkyls at the 10, 13 and 17 (positions most commonly at position 17). The substituents on the ring, their orientations, salt forms and other known variations of the basic ring are not critical to this invention.

Sterols are commercially available from a variety of chemical supply houses. Although not exhaustive, a representative list of sterols includes: androstenolone, androsterone, brassicasterol, calciferol, campesterol, cholesterol, cholestanol, cholestenone, coprostene, cortisone, demosterol, diosgenin, dihydrocalciferol, ergosterol, epicholestanol, estrone, estradiol, fucosterol, hecogenin, hexahydrolumisterol, lanosterol, lumisterol, pregnenolone, progesterone, oestrone, sarsasapogenin, sitosterol, smilagenin, spinastenol, stigmasterol, stigmastanol, testosterone, tigogenin and tomatidine.

A variety of sterols are available from commercial sources such as Sigma Chemical Co. in St. Louis, Mo., The Upjohn Co. in Kalamazoo, Mich. or U.S. Biochemical Co. in Cleveland, Ohio.

The preparation of fresh crystals of sterols both pure and mixed is known. D. Hirsch et al., *Clin. Chim. Acta*, 174, 55–64, 1988; and, L. Karpuj et. al., *Israel J. of Chem.* 22, 256–258, 1982. Typically, the sterols are first dissolved in wet polar solvent such as ethanol. Approximately 8 to 41 gms total dry sterol is dissolved in about 500 mls of 90% ethanol. The alcohol is warmed as necessary until the sterols are completely dissolved. The alcohol temperature is then gradually cooled for about 30 minutes to a temperature at which crystal formation is begun. The resulting slurry is best stirred slowly during this process.

The slurry is allowed to sit until the greater part of the sterols have precipitated from solution. The crystals are then filtered and repeatedly washed with deionized water, lightly compressed and suctioned free of liquid water.

The crystals are then suspended in water contained in a sealable tube or other ice encapsulating unit at a rate of from approximately 0.1 to 0.8 gms per unit. Critical tests are preferably done in sealed 50 mL transparent plastic tubes containing 20 mL water and 0.1 gms dry weight sterol. The sealed tubes are then tested for stability and nucleation temperatures. To test stability, the samples may be warmed above ambient temperatures or simply allowed to sit for predetermined intervals.

The testing protocol for determining the preferred sterols is simple. To ensure that the test crystals are terminally hydrated, the crystal suspensions are allowed to sit for at least 30 days at ambient temperatures of between $10°$ C. and $30°$ C. After this period, the sealed transparent tubes are then immersed into a temperature controlled alcohol bath at, for example, $-6°$ or at $-2°$ C. and observed on hourly time interval for the formation of ice crystals.

Crystals tend to form on the walls of the tube. By rotating the tube on a suitable angle using incident light, one can readily visualize ice crystal formation.

The very best very high temperature nucleators will begin ice formation under quiescent conditions within 60 minutes at $-2°$ C. in at least half their tests.

The crystalline hydrated forms of most sterols have not been well studied. Therefore the best way to select a sterol having a suitable stable nucleation temperature is using the above test. Although it was discovered that the prior art sterol nucleator, cholesterol was an inferior nucleator, the other sterols tested are quite acceptable for commercial ice making systems. Example D provide the results of one test where diosgenin and stigmasterol were compared to cholesterol.

Other sterols having nucleating temperatures of greater than $-6°$ C. are readily identified using the above test system.

Although the tests to determine the nucleation temperatures of the 3-hydroxy sterols are done under quiescent conditions, kinetic energy is commonly used to enhance the nucleation of ice. To this effect, it is desirable to expose the sterol-containing solutions to sufficient energy to induce crystallization at temperatures at which no ice forms under quiescent conditions. Preferred kinetic energy are vibrational or acoustical. The upper range of energy should not heat the solution to any appreciable fraction preferably less than 0.2° C. The lower limit of energy is any amount able to induce macroscopic particulate movement when viewed through direct light. Routine experimentation can be used to determine optimum energy levels for each application. Devices to induce energy are commercially available.

In addition to the above described methods, systems for forming and thawing ice for cooling warm surfaces are also envisioned to take advantage of the above described methods. Such systems would include a refrigeration device in fluid contact with vessels containing the aqueous 3-hydroxy sterol suspensions of the present invention. A heat-transfer fluid provides contact between the refrigeration device and the vessels. The vessels are also in fluid contact with a cooled surface capable of thermally transferring energy between it. The heat-transfer fluid contacting the vessels with the refrigeration device can also serve to provide fluid contact between the vessels and the cooled surface. The fluid flows between the refrigeration device, the vessels and cooled surface under the pressure of a pumping device.

In the above system, the refrigeration system lowers the temperature of the heat-transfer fluid or a portion thereof in order to freeze the sterol-containing solutions in the vessels. To freeze the solutions, the fluid flows between the refrigeration device and the vessels. The refrigeration device can then be optionally turned off and the vessels used as the sole source of thermal absorption. The heat transfer fluid is then flowed between the vessels and the cooled surface.

Refrigeration systems are commercially available and are suitable for use in this system. Heat transfer fluids are also known. They are typically aqueous solutions containing a salt or other composition which prevents its solidification at low temperatures. Such solutions include brine, ethylene glycol solutions and alcohol solutions. The vessels can be any sealable container containing the solutions described herein. Such containers can be made of plastic, glass, or metal. The cooled surface is preferably a part of the ventilation system for a building but can be any surface which is exposed to undesired heat. Typically such surfaces are metallic in composition.

A preferred use for this invention is the nucleation of ice crystals in a chilled water system designed to cool large buildings. (An example of such a chilled water system is disclosed in U.S. Pat. No. 4,928,493 which issued May 29, 1990 to Gilbertson, Meyers and Kinneberg. See especially, FIG. 1, and the description related thereto, which are incorporated by reference herein.) Such a system is closed and preferably operates with a minimum of routine maintenance. The ice forming containers of such a system preferably have a life expectancy of 5, 10, or 20 years. Thus the sterols should be selected for stability as well as their high nucleating temperatures. As they are organic compounds, they are susceptible to microbial degradation. Thus the water should be kept free of nutrients such as phosphorous and nitrogen compounds capable of supporting growth. Non-toxic sterols are preferred.

The following examples are provided by way of illustration and not by way of limitation. Those of skill will understand that this invention can be practiced in a variety of different modes and ways by simply varying non o critical parameters.

EXAMPLES

A. Preparation of diosgenin:stigmasterol 3:1.

The preferred sterol is a crystalline form of 3 parts diosgenin and I part stigmasterol.

To a 500 mL reaction flask fitted with a heating mantle, overhead stirrer, and reflux condenser is added cold 15.00 gm. diosgenin (Sigma Chemical Co., approx. 98%), 5.00 gm stigmasterol (US Biochemical Corp.) and 220 mL wet ethanol (10.0% v/V water made up with anhydrous 3A Special denatured reagent ethanol). The stirred flask is brought to reflux. The sterols will remain incompletely dissolved. Next over a 30 min period a further 40.0 mL of 4.9% v/V aqueous alcohol is added in small portions until all sterols have dissolved leaving a slight dark haze. 2.0 mL water is added to adjust all alcohol to 10% v/V aqueous and the mantle is removed. Stirring is continued as the flask cools in quiet air. In 10 min, the temperature will fall to 62.7° C. whereupon crystals will densely nucleate. The unheated mantle can be returned to slow further cooling. After a few more minutes at 60.7° C. a non-settling slurry will form.

The stirrer is stopped and the flask allowed to cool quietly for 70 min to give a 31° C. crystalline mass shrinking from the flask walls. The mass is broken up, mixed, and allowed to stand quietly for an additional 19.6 hr except for one more intermediate mixing prior to Büchner filtration at 12° C. The crystals are easily filtered on Schleicher & Schuell (S&S) Paper No. 595, sucked free of liquor, washed with 150 mL of membrane filtered deionized water, lightly compressed, and suctioned free of liquid water for 30 min. The yield for our work was 42.1 gm of unsievably wet white crystals having a slight alcohol odor and containing 41% dry solids (86% sterol recovery).

B. Preparation of diosgenin.

Using the method of Example A but taking only 7.8 gms of pure diosgenin, a terminally hydrated form of diosgenin is obtained.

C. Preparation of stigmasterol.

Using the method of Example A but taking 3.9 gm of pure stigmasterol, a terminally hydrated form of stigmasterol is obtained.

D. Stability testing of the representative sterols.

The wet solids of Examples A, B and C are tested by separately mixing approximately 0.5 gms of equivalent dry weight wet solids portions each with 20 mL of membrane-filtered deionized water in a 50 mL transparent plastic centrifuge tube and then tightly capping and shaking.

The suspension is allowed to sit at ambient temperature 10° C. to 28° C. for 30 days.

Freezing activity is measured by a rapid numerical rating method. A well-stirred 50% alcohol freezing bath is maintained at −1.8° C. with a contacting mercury controller. Bath temperature is monitored with an ice-calibrated Fluke Model 52 battery powered thermocouple thermometer. Normal control fluctuations are ±0.2° C. A full freezing load may drive the temperature a few tenths of a degree higher. The plastic centrifuge tubes are usually tested in groups of five retained in a metal holder and pressed into nearly complete vertical bath submersion. Tubes from elevated temperature tests are first cooled to ambient an hour or less in water or in blowing air before testing. Before a test (unless otherwise specified) the caked solids in the point of the tube are resuspended by gentle shaking. A set of tubes is tested by placing in the bath and examining and rating hourly; or on shorter intervals, if positives show early.

Samples showing ice formation after the first quiescent hour in the bath are rated "4". Each tube is quickly removed from the bath and examined for ice under good light by gently inverting and twice washing down the walls. If no ice is observed during this gentle mixing, the tube is immediately returned for a second hour in the bath and then reexamined. If then freezing, the sample is rated "3". If not freezing, it can be quickly knocked twice with moderate force on the wooden bench and directly returned the bath for another hour. If ice is then found, the sample is rated "2". If not yet freezing, the tube is given several hard blows on the bench and returned for yet another hour. If ice is then found, the sample is rated "1"; otherwise the result is "0". The test takes at most 4 hours, usually less, and allows rapid relative activity rating of the phases.

In repeated testing the 3:1 diosgenin:stigmasterol crystals provided a rating of 4. 100% diosgenin was rated 3.25. 100% stigmasterol was rated 3.50. 1:1 diosgenin:stigmasterol was rated 3.0. In this system 100% cholesterol (terminally hydrated) was rated 2.5.

The cholesterol measured here is terminally hydrated and equivalent to prior preparations exhibiting an approximately $-7.2°$ C. nucleating temperature. Thus, samples with a stable rating significantly above the 2.5 value found for cholesterol in this test are potentially high temperature nucleators of commercial value meriting more detailed study in a $-6°$ C. bath. Rapid rating test results of 3.5 and above are possibly only for very high temperature nucleators of exceptional commercial value. Very few very high temperature nucleators even of unstable characteristics have ever been scientifically reported. It is a surprising finding that hydrated stigmasterol and hydrated 3:1 diosgenin:stigmasterol both appear to be stable very high temperature nucleators.

E. Activation ice formation in a chilled water system of building.

The invention set forth in U.S. Pat. No. 4,928,493 (incorporated herein by reference) was installed into a building. Substituting the sterol mixture of Example A for the cholesterol nucleator described therein. The sterols were mixed at 190 mg dry weight per ice chamber holding either 2.25 or 0.75 gallons of water.

What is claimed is:

1. A method for nucleating crystallization of a hydrogen-bonding ice crystal from an aqueous solution which comprises:
    (a) adding a terminally hydrated 3-hydroxy sterol to the solution in sufficient amount to raise the nucleating temperature to $-6°$ C. or more; and,
    (b) lowering the temperature of the solution until ice crystals form.
2. The method of claim 1 wherein the sterol is selected from the group consisting of stigmasterol, diosgenin and combinations thereof.
3. The method of claim 1 wherein the sterol is selected from the group consisting of ergosterol and tigogenin.
4. The method of claim 1 wherein the aqueous solution is repeatedly frozen and thawed.
5. The method of claim 1 wherein the aqueous solution is part of a cooling system for a building.
6. The method of claim 2 wherein the combination of sterols is about 3 parts diosgenin to 1 part stigmasterol.
7. The method of claim 1 wherein the sterol is a co-crystal.
8. The method of claim 1 wherein the nucleating temperature is $-2°$ C. or greater.
9. The method of claim 1 which further comprises exposing the solution to mechanical energy in an amount sufficient to promote crystal formation.
10. The method of claim 9 wherein the energy is acoustical.
11. The method of claim 1 wherein the solution is vibrated with sufficient force to promote crystal formation.
12. A method of nucleating ice formation in a chilled water system comprising:
    adding to the water a suspension of terminally hydrated 3-hydroxy sterol comprising diosgenin and stigmasterol wherein the ratio of diosgenin to stigmasterol is 100:0 to 50:50 and the amount of diosgenin and stigmasterol increases the nucleating temperature of the water to greater than $-6°$ C.; and,
    lowering the temperature of the water until ice forms.
13. A method of claim 12 wherein the nucleating temperature of the water is greater than $-2°$ C.
14. A method of inducing ice formation in water undergoing multiple cycles of freezing and thawing wherein the method comprises:
    adding an amount of terminally hydrated 3-hydroxy sterol sufficient to induce visible ice crystals at $-6°$ C. or greater in 60 minutes; and,
    lowering the temperature of the water until ice forms.
15. A method of claim 14 wherein the nucleating temperature of the water is greater than $-2°$ C.
16. A method for permanently increasing the crystallization temperature of a water solution comprising adding an amount of terminally hydrated 3-hydroxy sterol sufficient to induce visible ice crystals at $-6°$ C. or greater in 60 minutes.
17. The method of claim 16 wherein the sterol induces visible ice crystals at $-2°$ C.
18. The method of claim 16 wherein the sterol is selected from the group consisting of stigmasterol, diosgenin and combinations thereof.
19. The method of claim 18 wherein the combination of sterols is about 3 parts diosgenin to 1 part stigmasterol.
20. The method of claim 18 wherein the sterols are a co-crystal.
21. A method of nucleating ice formation in a chilled water system comprising adding to the water a suspension of terminally hydrated diosgenin and stigmasterol wherein the ratio of diosgenin to stigmasterol is 100:0 to 50:50 and lowering the water temperature until ice forms.
22. A system for chilling a warm surface comprising:
    a refrigeration device capable of cooling a heat transfer liquid below $-6°$ C.;
    a heat transfer liquid in fluid contact with the refrigeration device;
    a sealed vessel in fluid contact with the heat transfer liquid said vessel containing an aqueous solution comprising a terminally hydrated 3-hydroxy sterol in sufficient amount to raise the nucleating temperature to $-6°$ C. or more; and,
    the warm surface in fluid contact with the heat transfer liquid.
23. A system of claim 22 wherein the sterol is selected from the group comprising stigmasterol, diosgenin and combinations thereof.
24. A system of claim 22 wherein the sterol has a nucleating temperature of $-2°$ C. or more.

* * * * *

UNITED STATES PATENT AND TRADEMARK OFFICE
CERTIFICATE OF CORRECTION

PATENT NO. : 5,239,819

DATED : August 31, 1993

INVENTOR(S) : Bruce I. Kinneberg

It is certified that error appears in the above-identified patent and that said Letters Patent is hereby corrected as shown below:

Column 3, line 2, "Studied" should read -- Studies --.

Column 3, line 31, ";" after cholesterol should read -- , --.

Column 4, line 49, "O.I" should read -- 0.1 --.

Column 4, line 51, "an" should read -- a --.

Column 7, line 68, "non o critical" should read -- non-critical --.

Signed and Sealed this

Seventeenth Day of May, 1994

*Attest:*

BRUCE LEHMAN

*Attesting Officer*     Commissioner of Patents and Trademarks